W. L. MURRAY.
CANNING APPARATUS.
APPLICATION FILED FEB. 24, 1912.
1,052,365.
Patented Feb. 4, 1913.
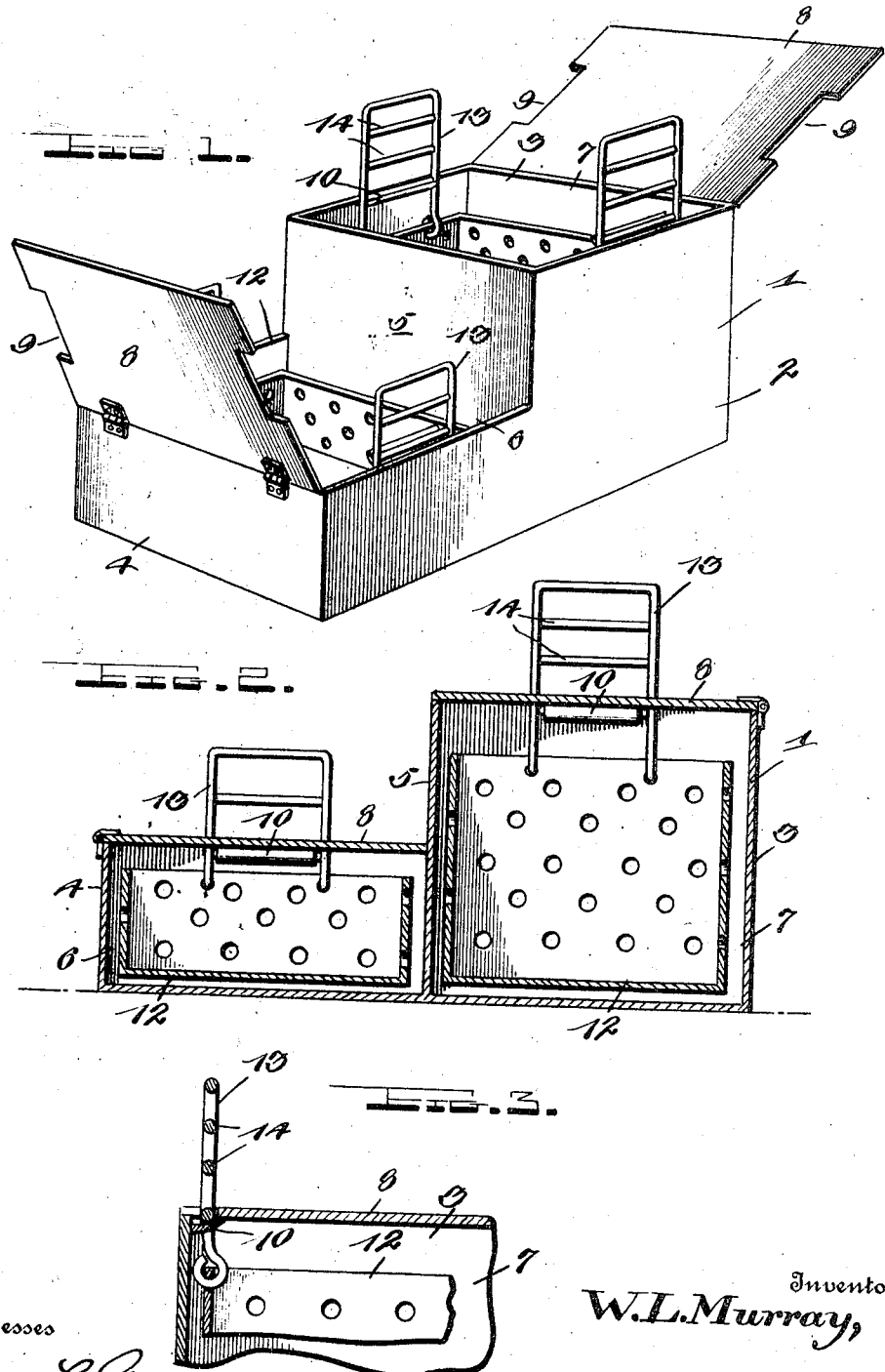
Witnesses
Chas. L. Griesbauer.
A. B. Norton.
Inventor
W. L. Murray,
By Watson E. Coleman.
Attorney

UNITED STATES PATENT OFFICE.

WILLIAM LEE MURRAY, OF McKENZIE, TENNESSEE.

CANNING APPARATUS.

1,052,365.  Specification of Letters Patent.  Patented Feb. 4, 1913.

Application filed February 24, 1912. Serial No. 679,723.

*To all whom it may concern:*

Be it known that I, WILLIAM L. MURRAY, a citizen of the United States, residing at McKenzie, in the county of Carroll and State of Tennessee, have invented certain new and useful Improvements in Canning Apparatus, of which the following is a specification, reference being had to the accompanying drawings.

This invention comprehends certain new and useful improvements in canning apparatus and relates more particularly to that class of apparatus which employs steam as a cooking agency.

The object of the invention is to provide a simple, inexpensive and efficient device of this nature which shall contain no superfluous space and which shall be especially adapted to the work in question. And this invention also aims to generally improve this class of devices to render them more useful and commercially desirable.

With these and other objects in view, as will be more fully apparent as the description proceeds, the invention consists in certain constructions and arrangements of parts that I shall hereinafter more fully describe and claim.

For a full understanding of the invention reference is to be had to the following description and accompanying drawing, in which—

Figure 1 is a perspective view of my canning apparatus complete, showing the covers open and the baskets in position; Fig. 2 is a longitudinal sectional view of the same with the covers closed; and Fig. 3 is a detail sectional view of one end of a compartment with a basket therein.

Corresponding and like parts are referred to in the following description and designated in the accompanying drawing by like reference characters.

Referring to the drawing by numerals, 1 designates a tank having the side walls 2 and end walls 3 and 4. A partition 5 divides the tank into two compartments. The smaller or exhausting compartment 6 is only one-half as deep as the larger steaming compartment 7 and is formed by cutting away corresponding upper quarter sections of the side walls 2 and the upper half of the adjacent end wall 4.

I have found that the exhausting process requires only about half as much time as the steaming process and furthermore, that only one tier of cans can be successfully exhausted at one time, therefore, I designed my apparatus so as to have the exhausting compartment accommodate only one tier of cans and the steaming compartment two tiers. This arrangement allows the apparatus to be run constantly at its full capacity thus utilizing all the space and making it very efficient.

I have provided each compartment with a cover 8 hinged to the outer end walls of the respective compartments. The covers are provided with elongated notches 9 adjacent their side edges adapted to register when said covers are closed, with the inwardly projecting transversely curved, basket supporting hook 10, formed integrally with the side walls 2 of my device.

The baskets used with this apparatus are shaped to fit the compartments and have a perforated body portion 12, and U-shaped handles 13 pivotally secured to the upper edges of the end walls of said body portion. A plurality of cross bars 14 are arranged horizontally between the arm members of the respective handles and are adapted to engage the supporting hooks 10 to hold the basket at any desired height above the bottom of the tank.

The operation of my device is as follows. A desired amount of water is placed in each compartment and heated. Cans containing the substance to be cooked are sealed with the usual vent left open, placed in one of the baskets, and transferred to the exhausting compartment. The cover is closed and the cans allowed to remain in this space until the steam has entirely displaced the air within the cans, after which they are removed by lifting out the basket. They are next capped and put into the steaming compartment where they remain until their contents have been sufficiently cooked.

It will be seen from the above description and accompanying drawing that I have provided an improved apparatus which may be used for canning every variety of fruits and vegetables in a very rapid and convenient manner.

Having thus described the invention what is claimed is:—

A steam canning apparatus comprising a tank divided into a plurality of compartments, a plurality of baskets having U shaped handles provided with a plurality of cross bars, elongated basket supporting hooks carried by the said walls of the tank, said hooks extending inwardly and upwardly and having their inner edges disposed in the same plane as the top of the respective compartments and covers hinged to the ends of the tank, the side edges of the covers being formed with elongated notches which register with the aforementioned supporting hooks, said hooks engaging the under side of the covers and preventing the escape of steam from the tank.

In testimony whereof I hereunto affix my signature in the presence of two witnesses.

WILLIAM LEE MURRAY.

Witnesses:
R. A. DINKINS,
J. T. EDGAR.